United States Patent
Charraud et al.

(10) Patent No.: US 12,521,889 B2
(45) Date of Patent: Jan. 13, 2026

(54) DEVICES, SYSTEMS, AND METHODS FOR COSMETIC ANALYSIS AND AUTOMATED LASH APPLICATION

(71) Applicant: L'Oreal, Paris (FR)

(72) Inventors: Gregoire Charraud, Jersey City, NJ (US); Rafael Feliciano, New Providence, NJ (US)

(73) Assignee: L'Oreal, Paris (FR)

( * ) Notice: Subject to any disclaimer, the term of this patent is extended or adjusted under 35 U.S.C. 154(b) by 143 days.

(21) Appl. No.: 18/649,679

(22) Filed: Apr. 29, 2024

(65) Prior Publication Data

US 2025/0332731 A1 Oct. 30, 2025

(51) Int. Cl.
| | | |
|---|---|---|
| B25J 9/16 | (2006.01) | |
| A41G 5/02 | (2006.01) | |
| B25J 9/00 | (2006.01) | |
| G06T 7/00 | (2017.01) | |

(52) U.S. Cl.
CPC .............. *B25J 9/1697* (2013.01); *A41G 5/02* (2013.01); *B25J 9/0084* (2013.01); *G06T 7/0002* (2013.01); *G06T 2207/10012* (2013.01); *G06T 2207/30201* (2013.01)

(58) Field of Classification Search
CPC ......... B25J 9/1697; B25J 9/0084; A41G 5/02; G06T 7/0002; G06T 2207/10012; G06T 2207/30201
USPC .................. 700/245–264; 318/568.11–568.25
See application file for complete search history.

(56) References Cited

U.S. PATENT DOCUMENTS

| | | | | |
|---|---|---|---|---|
| 7,600,519 B2 * | 10/2009 | Dinh | .......................... | A41G 5/02 |
| | | | | 132/216 |
| 8,127,774 B2 * | 3/2012 | Dinh | .......................... | A41G 5/02 |
| | | | | 132/216 |
| 8,701,685 B2 * | 4/2014 | Chipman | ................ | A45D 44/00 |
| | | | | 206/581 |
| 8,967,158 B2 * | 3/2015 | Sanbonmatsu | ........... | A41G 5/02 |
| | | | | 132/216 |
| 10,562,178 B2 * | 2/2020 | Harding | .................... | B25J 19/06 |
| 11,006,733 B2 * | 5/2021 | Harding | .................... | A41G 3/00 |
| 11,375,799 B2 * | 7/2022 | Harding | ............. | A41D 13/1184 |
| 11,589,667 B2 * | 2/2023 | Amundson | .............. | B25J 9/043 |

(Continued)

FOREIGN PATENT DOCUMENTS

| | | | | |
|---|---|---|---|---|
| CN | 1843284 A | 10/2006 | | |
| WO | WO-2020086193 A1 * | 4/2020 | ............ | B25J 19/063 |

OTHER PUBLICATIONS

Lofroth, M.; Avci, E. Development of a Novel Modular Compliant Gripper for Manipulation of Micro Objects. Micromachines 2019, 10, 313. https://doi.org/10.3390/mi10050313 (Year: 2019).*

(Continued)

*Primary Examiner* — Jaime Figueroa
(74) *Attorney, Agent, or Firm* — Christensen O'Connor Johnson Kindness PLLC

(57) ABSTRACT

Systems and methods for computation and application of eyelash enhancements to all or part of a subject's eyelashes. A system includes circuitry configured for a visual analysis of the subject's eyelashes and computation of at least one option for the eyelash enhancement based on the visual analysis, and circuitry configured to direct at least one micro-robot to apply the eyelash enhancement to the subject's eyelashes.

15 Claims, 6 Drawing Sheets

(56) References Cited

U.S. PATENT DOCUMENTS

| | | | | |
|---|---|---|---|---|
| 11,744,348 | B2* | 9/2023 | Harding | A45D 44/00 |
| | | | | 132/200 |
| 11,787,071 | B2* | 10/2023 | Amundson | B25J 9/1697 |
| | | | | 700/245 |
| 2004/0050400 | A1 | 3/2004 | Takahashi et al. | |
| 2012/0158019 | A1* | 6/2012 | Tenney | A61B 34/10 |
| | | | | 606/133 |
| 2018/0343948 | A1 | 12/2018 | Miller et al. | |
| 2019/0269222 | A1* | 9/2019 | Harding | B05B 13/0431 |
| 2019/0269223 | A1* | 9/2019 | Harding | B33Y 10/00 |
| 2019/0314997 | A1* | 10/2019 | Amundson | A41D 13/11 |
| 2019/0335835 | A1* | 11/2019 | Harding | G06T 7/70 |
| 2021/0235847 | A1* | 8/2021 | Harding | B25J 9/023 |
| 2021/0387364 | A1* | 12/2021 | Amundson | B25J 15/0441 |

OTHER PUBLICATIONS

Preliminary Search Report and Written Opinion mailed Dec. 19, 2024, issued in related FR Application No. 2406592, filed Jun. 20, 2024, 8 pages.

International Search Report and Written Opinion mailed Jul. 23, 2025, issued in related International Application No. PCT/US2025/024574, filed Apr. 14, 2025, 13 pages.

* cited by examiner

DEVICES, SYSTEMS, AND METHODS FOR COSMETIC ANALYSIS AND AUTOMATED LASH APPLICATION

SUMMARY

In an aspect, the disclosure provides a system for computation and application of an eyelash enhancement, the system comprising: circuitry configured for a visual analysis of a subject's eyelashes and computation of at least one option for the eyelash enhancement based on the visual analysis; and circuitry configured to direct at least one micro-robot to apply the eyelash enhancement to the subject's eyelashes.

In embodiments, at least a portion of the circuitry configured for the visual analysis is remote to the at least one micro-robot.

In embodiments, the visual analysis comprises computation of the eyelash enhancement for a subset of the subject's eyelashes.

In embodiments, the subset of the subject's eyelashes is computed by circuitry of the system as being shorter than other of the subject's eyelashes and wherein the eyelash enhancement comprises an eyelash extension.

In embodiments, the visual analysis comprises computation of the eyelash enhancement for all of the subject's eyelashes.

In embodiments, the eyelash enhancement comprises an eyelash extension.

In embodiments, the system comprises circuitry configured to communicate the at least one option to the subject and receive at least one user-selected eyelash enhancement as at least a portion of the eyelash enhancement.

In embodiments, the system comprises circuitry configured to compute a plurality of steps for application of the eyelash enhancement to the subject's eyelashes by the at least one micro-robot.

In embodiments, the system comprises circuitry configured to monitor and analyze application of the eyelash enhancement for an application analysis and compute at least a portion of a plurality of steps for application of the eyelash enhancement to the subject's eyelashes by the at least one micro-robot, in real-time and during application of the eyelash enhancement, based on the application analysis.

In embodiments, the system comprises circuitry configured to: perform at least one intrinsic calibration and at least one extrinsic calibration; capture at least one stereo image of the subject's eyelashes; compute, based on the at least one stereo image, a plurality of eyelash characteristics and a plurality of robot characteristics; compute, based on the plurality of eyelash characteristics, a region of the subject's eyelashes to receive at least a portion of the eyelash enhancement; and compute, based on the plurality of robot characteristics and the region, a plurality of micro-robot steps for movement of the micro-robot to the region and application of at least the portion of the eyelash enhancement to the region.

In embodiments, the plurality of micro-robot steps comprises: movement of the micro-robot to the region; separation of at least a portion of the subject's eyelashes at the region; estimation of length of at least the portion of the subject's eyelashes at the region; and application of at least a portion of the eyelash enhancement to at least the portion of the subject's eyelashes at the region.

In embodiments, at least a portion of the steps are performed iteratively until at least the portion of the subject's eyelashes at the region have received at least the portion of the eyelash enhancement thereon.

In embodiments, the system comprises a micro-robot system that comprises: a first micro-robot comprising a first singulating arm that is operably connected to: a first shuttle bot configured for movement of a first segment of the first singulating arm along a first element; and a first singulating bot configured for movement of a second segment of the first singulating arm along a second element; and a second micro-robot comprising a second singulating arm that is operably connected to: a second shuttle bot configured for movement of a second segment of the second singulating arm along the first element; and a second singulating bot configured for movement of a second segment of the second singulating arm along the second element.

In embodiments, a separation movement of the first micro-robot, the second micro-robot, or both, separates an eyelash of the subject from one or more adjacent eyelashes of the subject for application of at least a portion of the eyelash enhancement to the eyelash, and wherein a release movement of the first micro-robot, the second micro-robot, or both, releases the eyelash of the subject.

In embodiments, the application of at least the portion of the eyelash enhancement to the eyelash comprises gluing a lash extension to the eyelash.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

TABLE 1

Figure 1:
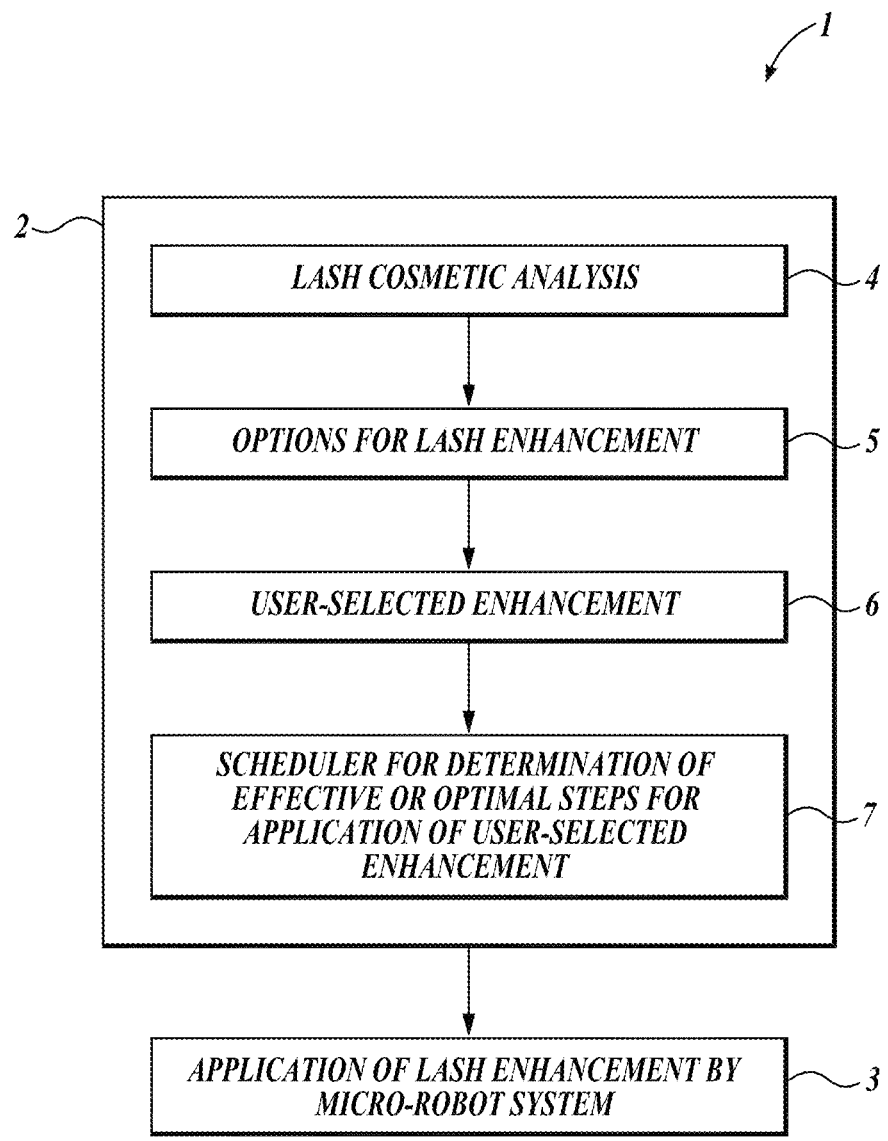
FIG. 1 shows a flow chart for cosmetic analysis and enhancement as performed by a system, according to aspects of the disclosure.

Drawing element references and descriptions.

| Reference numeral | Description |
|---|---|
| 1 | Flow chart for cosmetic analysis and enhancement |
| 2 | Circuitry configured for cosmetic analysis and schedule for system operation |
| 3 | Micro-robot system operation |
| 4 | Lash cosmetic analysis |
| 5 | Options for lash enhancement |
| 6 | User-selected enhancement |
| 7 | Scheduler for coordination of micro-robot system application of enhanced eyelashes |
| 8 | Circuitry configured as vision system for beauty diagnosis |
| 9 | Circuitry configured as integrated vision system for micro-robot system |
| 10 | Cosmetic analysis software development kit (SDK) |
| 11 | Circuitry configured as scheduler for coordination of micro-robot system application of enhanced eyelashes |
| 12 | Lash gripper |
| 13 | Lash separator |
| 14 | Lashes pods |
| 15 | Circuitry configured as platforms controller |
| 16 | Circuitry and mechanics configured as electromagnetic platform |
| 17 | Circuitry and mechanics configured as left eye applicator platform |
| 18 | Circuitry and mechanics configured as left eye separator platform |
| 19 | Circuitry and mechanics configured as right eye applicator platform |
| 20 | Circuitry and mechanics configured as right eye separator platform |
| 21 | Circuitry and mechanics configured as gluing system |
| 22 | Scheduler circuitry step: calibration |
| 23 | Scheduler circuitry step: image capture |
| 24 | Scheduler circuitry step: keypoint detection |
| 25 | Scheduler circuitry step: eyelash detection and cropping |
| 26 | Scheduler circuitry step: density estimation |
| 27 | Scheduler circuitry step: divide eyelashes into sub-portions |
| 28 | Scheduler circuitry step: get 2D region pixels |
| 29 | Scheduler circuitry step: detect micro-robot in image |
| 30 | Scheduler circuitry step: obtain micro-robot 3D coordinates |
| 31 | Scheduler circuitry step: calculate disparity/dense stereo |
| 32 | Scheduler circuitry step: obtain 3D region pixels |
| 33 | Scheduler circuitry step: move robot to region |
| 34 | Scheduler circuitry step: separate out eyelashes/singulation |
| 35 | Scheduler circuitry step: length estimation |
| 36 | Scheduler circuitry step: apply extension |
| 37 | Micro-robots assembly (movement) |
| 38 | Micro-robots assembly (stationary) |
| 39 | Singulating arm segment 1 (left) |
| 40 | Singulating arm segment 1 (right) |
| 41 | Singulating tip (left) |
| 42 | Singulating tip (right) |
| 43 | Singulating arm segment 2 (left) |
| 44 | Singulating arm segment 2 (right) |
| 45 | Shuttle bot 1 |
| 46 | Shuttle bot 2 |
| 47 | Singulating bot 1 |
| 48 | Singulating bot 2 |
| 49 | First element/sliding surface/bearing 1 |
| 50 | Mechanical stop 1 |
| 51 | First element/sliding surface/bearing 2 |
| 52 | Mechanical stop 2 |
| 53 | Second element/rotary bearing 1 |
| 54 | Second element/rotary bearing 2 |

TABLE 1-continued

Drawing element references and descriptions.

| Reference numeral | Description |
|---|---|
| 55 | Natural lash |
| 56 | Shorter lashes |
| 57 | Partially extended lashes |
| 58 | Shorter lashes with extension thereon |
| 59 | Fully extended lashes |
| 60 | Tube and gripper receptacle |
| 61 | Micro-robot 1 |
| 62 | Micro-robot 2 |
| 63 | V-gripper |
| 64 | Wire comb |
| 65 | Eyelash |
| 66 | Pull rod |

The foregoing aspects and many of the attendant advantages of this disclosure will become more readily appreciated as the same become better understood by reference to the following detailed description, when taken in conjunction with the accompanying drawings.

DETAILED DESCRIPTION

Application of eyelash extensions to eyelashes is typically performed manually by adhering the extensions to the eyelashes and securing them in place with an adhesive. Typical artificial eyelash extensions cover the full set of eyelashes, regardless of whether all or a subset of the eyelashes need the extension. In contrast to a subject's natural eyelashes, extensions can be easily identifiable as being artificial due to their size and shape relative to the subject's natural features, and are typically not able to be customized with regard to size, shape, mass, color, density, and other characteristics of the extensions. In addition, in instances where a subset of the subject's eyelashes (but not all of the subject's eyelashes) need an extension, application of a typical eyelash extension can be unnecessary and wasteful, or undesired.

Accordingly, there is a need for approaches for user-mediated selection or customization, and automated or semi-automated application, of eyelash extensions that enhance all or a subset of the eyelashes of the subject. The present disclosure addresses these and other long-felt and unmet needs in the art.

FIG. 1 shows a flow chart 1 for cosmetic analysis and enhancement as performed by a system of the disclosure. In various aspects, a system for computation and application of an eyelash enhancement includes circuitry 2 configured for a cosmetic analysis 4 of a subject's eyelashes, computation of one or more options 5 for enhancement of the subject's eyelashes, processing of a user-selected or user-affirmed enhancement 6, and configuration of a scheduler 7 for the computation of a plurality of effective or optimal steps to be implemented for application of the cosmetic enhancement to the subject's eyelashes by a micro-robot system 3. The disclosure provides devices, systems, and methods for improved coordination between the determination of options for improvement of the subject's eyelashes and the application of one or more user-elected options for eyelash enhancement. The scheduler, among other elements of the disclosure, ensures that application of the lash enhancement occurs in a movement efficient manner, such that the micro-robot system performs a minimal or near-minimal number of movements for precise and expedient application of the eyelash enhancement. These and other features of the disclosure can help ensure that a customer (e.g., a subject) receiving an eyelash enhancement service does not need to wait an extended period of time, and receives an accurate, precise, and time-efficient lash enhancement service.

In a general aspect, systems of the disclosure comprise circuitry configured for a visual analysis of a subject's eyelashes and computation of at least one option for the eyelash enhancement based on the visual analysis, and circuitry configured to direct at least one micro-robot to apply the eyelash enhancement to the subject's eyelashes. The circuitry can be configured to capture and/or receive an image, such as a digital photograph, of the subject's face or a portion thereof. The circuitry can be configured to analyze the image for a determination of features of the subject's eyelashes that can at least potentially be enhanced with eyelash enhancement. Such features can include, for example, thin or uneven eyelashes, shorter eyelashes, missing or damaged eyelashes, irregular eyelashes, and the like. The circuitry can be configured to compute, based on at least the visual analysis, one or more suggested eyelash enhancements to be visually presented, using a display of a computational device, for example. The presented options for eyelash enhancement can be viewed by a viewer such as the subject or another individual, such as a salon worker. The viewer can select one or more of the options, e.g., with use of the computational device, to be processed by the circuitry for computation of a plurality of steps for application of the one or more options to the eyelashes of the subject by the system.

In embodiments, the system can utilize a subject-generate digital photograph of their face and/or eyelashes, at which point an artificial intelligence (AI) and/or machine learning (ML) algorithm can count, characterize (e.g., length of eyelashes), and label each eyelash. The system can identify which eyelash or eyelashes potentially needs to be extended to enhance a beauty/cosmetic effect of the subject, and can allow the subject or a salon worker, for example, to select which eyelashes to receive the enhancement thereon. Use of the system can be implemented as part of a service, such as a service at a beauty salon or other place of business, for example. The system can include an at least partially enclosed space, such as a box shape, within which the subject inserts their head and/or face, at which point the system maps out where the eyelashes are on the head or face, and computes a plurality of tasks for execution by the system according to the scheduler, as described herein.

Figure 2:
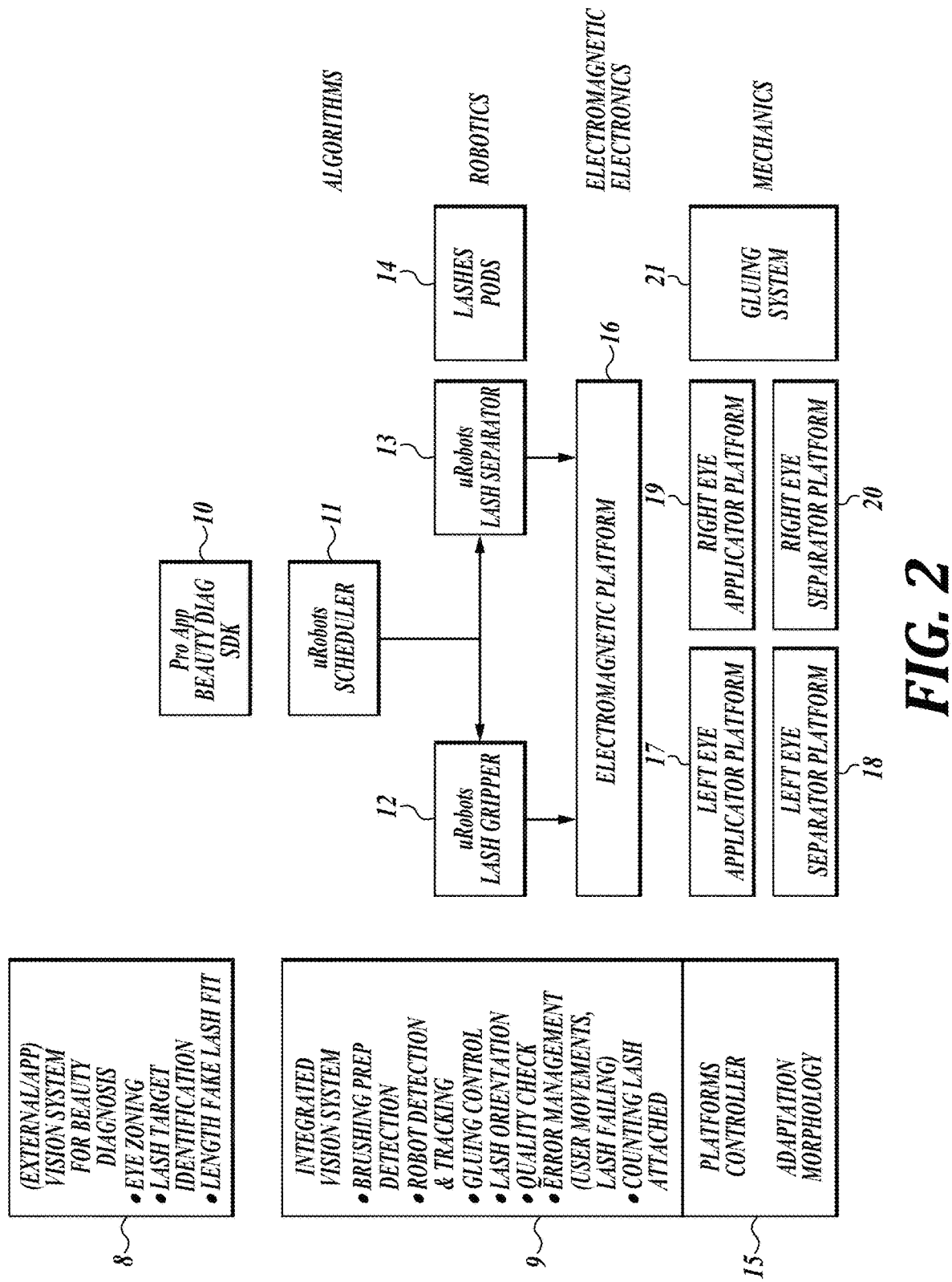
FIG. 2 shows a diagram of elements of a system for cosmetic analysis and enhancement, according to aspects of the disclosure.

As shown at FIG. 2, a diagram of elements of a system for cosmetic analysis and enhancement can comprise a number of features including but not limited to algorithms, robotics, electromagnetic electronics, and mechanics features. For example, a system can include circuitry 8, such as a vision system, configured for a beauty diagnosis or a visual analysis. At least part of circuitry 8 can be implemented in the form of a remote webserver, for example, such that at least a portion of the circuitry configured for the visual analysis is remote to the at least one micro-robot. Circuitry 8 can be configured to receive an image, such as a digital image from a smartphone, by way of one or more operable or network connections with the smartphone. Such an image can be processed by circuitry 8 for determination of one or more zones of the eyelashes, identification of one or more actual or potential eyelash targets for eyelash enhancement, and determination of one or more options for a length of the eyelash extension that can be presented as an option to a viewer and/or selected by the subject or salon professional, for example.

Accordingly, in embodiments, the system comprises circuitry configured to communicate the at least one option to the subject and receive at least one user-selected eyelash enhancement as at least a portion of the eyelash enhancement. Presentation of one or more such options can occur by way of a display on a smartphone, for example, as an overlay placed over the image of the subject and/or as an overlay placed over a recorded video or real-time video stream of the subject, for example. This enables the subject and/or viewer to simulate results prior to selecting and committing to a particular eyelash enhancement.

An integrated vision system can comprise circuitry 9 configured for detection of eyelash brushing and/or preparation for eyelash brushing, detection and tracking of one or more micro-robots, control of one or more eyelash extension gluing operations, detection of eyelash orientation, quality checking to ensure accurate, precise, and movement-efficient application of the eyelash enhancement, management of system adjustments due to errors such as user movements, eyelash failing or detaching from the subject, blinking, and the like, and one or more processes for counting eyelashes including eyelashes having received the eyelash enhancement thereon and eyelashes that still need the eyelash enhancement attached thereto. For example, if the subject blinks or moves, the system can immediately stop an ongoing operation and remove micro-robots and any other elements from a space near the subject's face so as to avoid injury or inadvertent contact of these elements with the subject. The system can visually observe the subject and detect when the subject has returned to a stationary state, and can confirm with the subject if and when it is acceptable to the subject for the system to proceed with the eyelash application. This can occur, for example, by delivery of audio and/or visual feedback or communication to and/or from the system and the subject, and/or through manual confirmation with the subject by a salon worker, for example, who can oversee the application process.

A platforms controller can include circuitry 15 configured to enable the system to adapt to the subject's morphology. Such adaptation can occur in real-time as a result of a real-time visual analysis of the subject's morphology, and/or can occur prior to initiation of application of the eyelash enhancement to the subject's eyelashes, for example, as part of preparation steps undertaken by the system before beginning application of the eyelash enhancement.

A system can comprise and/or implement a beauty diagnostic software development kit (SDK) 10, for example, with modules or elements thereof configured as a software application for visual analysis. Such an SDK can be deployed remotely to the micro-robots or locally to the micro-robots, in embodiments. In embodiment, diagnosis by circuitry of the system can enable a smartphone to map out and create eyelashes zones, e.g., as part of a "divide and conquer" process strategy, and such a mapping communicated to robotics features for execution of an eyelash extension service according to one or more pre-selected eyelash enhancements. The disclosed system can identify all or part of the eyelashes of the subject that are to receive the enhancement and can maximize the quality of the results and minimize the time needed for the application.

In embodiments, the system comprises circuitry 11 configured to compute a plurality of steps for application of the eyelash enhancement to the subject's eyelashes by the at least one micro-robot. Circuitry 11 can be configured as a micro-robots scheduler that computes, for example with use of one or more machine learning (ML) methods, an optimal or effective plurality of steps to be carried out by the micro-robots system, as part of a hierarchical or prioritized process. An example of a ML method that can be used for configuration of the micro-robots scheduler can include a ML model trained with images of subjects' eyelashes, taken before and after being brushed (e.g., manually brushed) with a patch or cosmetic tool for eyelash extension, for example, such that the ML model can compute, based on an image of the subject's face prior to use of the system, one or more suggested styles or enhancements for presentation to the subject as one or more options. The circuitry can be configured with the ML model to take into consideration characteristics of the subject's appearance, such as face shape and size, eyelashes shape and size, popular options selected by other subjects with the same or similar characteristics, and the like.

In embodiments, the system can comprise robotics features as micro-robots configured to separate out individual eyelashes and apply extensions to lashes, one by one, on an individual basis. In embodiments, the system comprises a micro-robots lash gripper 12 and a micro-robots lash separator 13, configured to grip and separate the lashes from each other. In embodiments, the system can comprise one or more lashes pods 14, which can be a reusable element such as an eyelash extension composition contained within a pod form factor, for example, that is accessed and used by the robotics features of the system. These and other elements of the system can be coordinated or controlled by way of an electromagnetic platform 16 which can include, among other elements, one or more electronic and/or servo motors operably connected to one or more power sources, such as one or more batteries or sources of alternating current (AC), for example. Mechanics of the system can include structural features configured as a left eye separator platform 18 (separates eyelashes of the left eye), a left eye applicator platform 17 (applies the enhancement to eyelashes of the left eye), a right eye separator platform 20 (separates eyelashes of the right eye), and a right eye applicator platform 19 (applies the enhancement to eyelashes of the right eye).

At a high level and as a general process, during operation, the system evaluates the subject's eyelashes, e.g., a visual analysis, determines a region and a specific eyelash to which an enhancement is to be applied in a particular iteration, separates the specific eyelash from one or more adjacent eyelashes, applies the enhancement to the specific eyelash, and continues this process with regular monitoring and quality checking until each eyelash that is to receive the enhancement thereon has received the enhancement thereon. Accordingly, in embodiments, the system comprises circuitry configured to monitor and analyze application of the eyelash enhancement for an application analysis and compute at least a portion of a plurality of steps for application of the eyelash enhancement to the subject's eyelashes by the at least one micro-robot, in real-time and during application of the eyelash enhancement, based on the application analysis.

Figure 3:
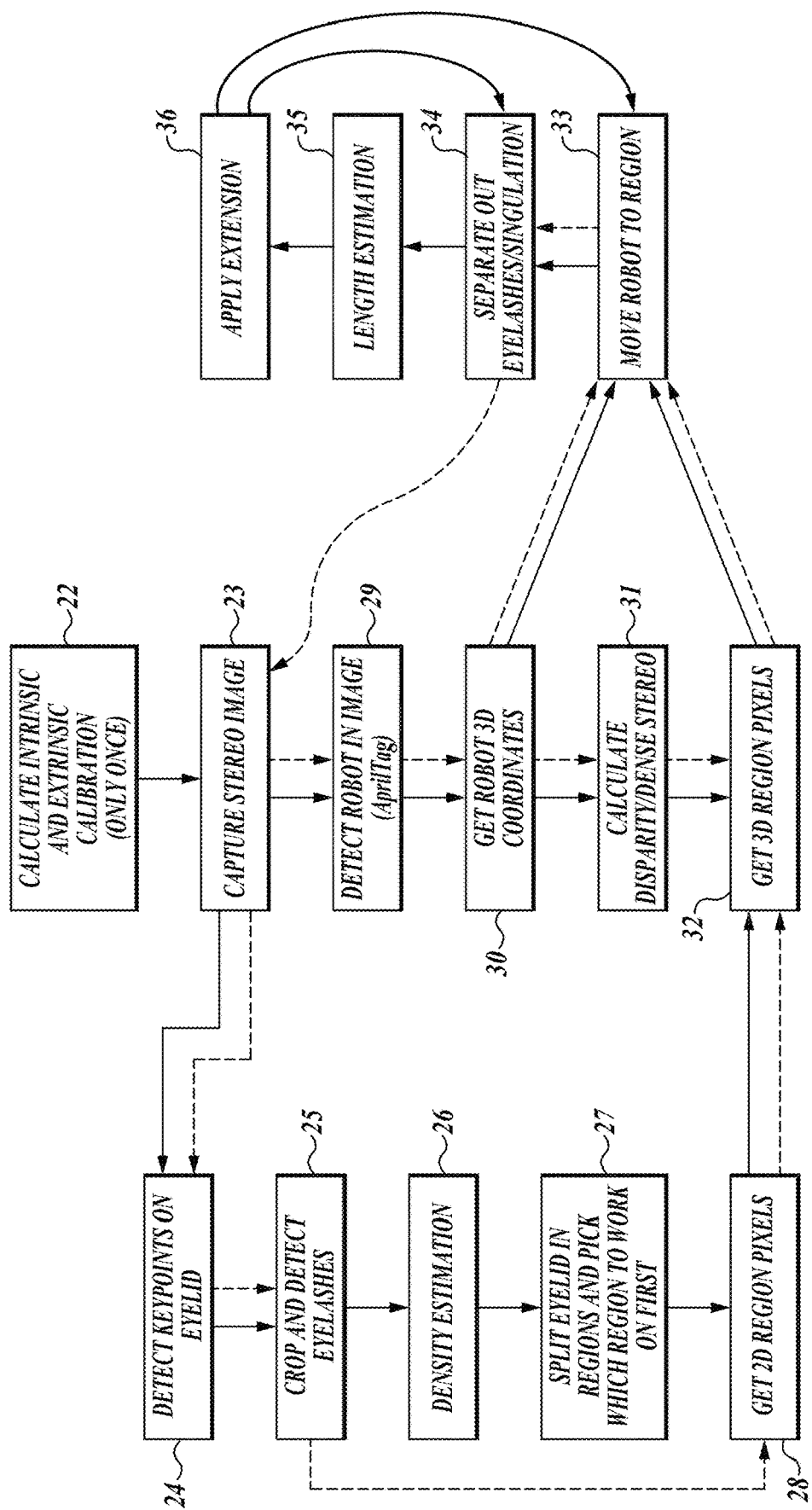
FIG. 3 shows a diagram of various steps of cosmetic analysis and enhancement as performed by a system, according to aspects of the disclosure.

As shown at FIG. 3, various steps of cosmetic analysis and enhancement as can be performed by a system are disclosed. In embodiments, the system comprises circuitry configured to: perform at least one intrinsic calibration and at least one extrinsic calibration 22, capture at least one stereo image of the subject's eyelashes 23, and compute, based on the at least one stereo image, a plurality of eyelash characteristics (e.g., steps 24, 25, 26, 27, 28) and a plurality of robot characteristics (e.g., steps 29, 30, 31, 32). In embodiments, the system is configured to compute, based on the plurality of eyelash characteristics, a region of the subject's eyelashes to receive at least a portion of the eyelash enhancement (e.g., steps 27, 28, 32), and compute, based on the plurality of robot characteristics and the region, a plurality of micro-robot steps (e.g., steps 33, 34, 35, 36) for movement of the micro-robot to the region and application of at least the portion of the eyelash enhancement to the region.

Since the micro-robots are operating within a sensitive space of the subject's body, in embodiments, the use of a stereo image by the system enables 3D measurements of the subject's head or face and eyelashes, and the micro-robots, by the system to ensure that the micro-robots do not inappropriately contact or injure the subject during operation. In embodiments, the system can perform a baseline quality check to ensure that the subject remains still for a suitable amount of time prior to initiation of mechanical operations. At the time the subject remains still, the system can proceed with one or more calibrations for ensuring the micro-robots are in the correct 3D position and configuration for the beginning of an operation. If the system halts an operation due to error or unexpected movement of the subject (e.g., eyes transition from closed position to open position or eyes twitch or flutter), this process can repeat and the system perform additional calibrations as needed.

In embodiments, superior (top) eyelashes can selectively receive the eyelash enhancement or extension thereon, and the inferior (bottom) eyelashes can be excluded from receiving the enhancement or extension. The system can be configured for differentiation of the superior eyelashes from the inferior eyelashes, for example, based on location and/or thickness, or alternatively, the system can be aided with this differentiation by detecting a mask applied to the bottom lashes prior to use of the system. The mask applied to the bottom lashes can be applied by a salon professional, for example. The vision system of the system, which includes a camera or other optical detection device, can detect the mask on the bottom eyelashes and exclude the bottom eyelashes from the operation based on this detection.

In embodiments, the system can estimate density of the eyelashes, or a number of lashes within a given area of the eyelashes or eyelid. The system can computationally divide the eyelashes into regions according to a pre-defined region width or a region width that is computed for a particular subject as part of the visual analysis. In embodiments, the system can divide the length of the eyelashes into 5 mm regions, for example. In other embodiments, the system can divide the length of the eyelashes into 1 mm regions, 2 mm regions, 3 mm regions, 4 mm regions, 5 mm regions, 6 mm regions, 7 mm regions, 8 mm regions, 9 mm regions, 10 mm regions, or any approximation and/or combination thereof. In embodiments, key points of the eyelid evaluated by the system include the start end, the stop end, the base of the eyelash, the end of the eyelash, the thickness of the eyelash, one or more characteristics of the eyelash shape, and the like.

In embodiments, the plurality of micro-robot steps comprises movement of the micro-robot to the region 33, separation of at least a portion of the subject's eyelashes at the region 34, estimation of length of at least the portion of the subject's eyelashes at the region 35, and application of at least a portion of the eyelash enhancement to at least the portion of the subject's eyelashes at the region 36. Arrows in FIG. 3 indicate transitions between steps; as shown, certain of the steps (e.g., steps 33, 34, 35, 36) can be repeated iterated until an operation is completed. Similarly, before, during, and/or after separating out the eyelashes 34, the system can capture a stereo image 23 for continuous visual analysis during operation of the micro-robots. By obtaining multi-dimensional visual information, e.g., such as getting the robot 3D coordinates 30 from visual analysis of the stereo image 23 by the system, the distance from the micro-robot to the eyelashes can be reliably determined and the system can operate with depth perception for avoidance of unintended contact with the subject's face, eye, or eyelashes. Since the calibration step 22 may only need to be performed once, in embodiments, at least a portion of the steps (e.g., steps 23-36) can be performed iteratively, e.g., as part of a continuous operation, until at least the portion of the subject's eyelashes at the region have received at least the portion of the eyelash enhancement thereon.

Figure 4A:
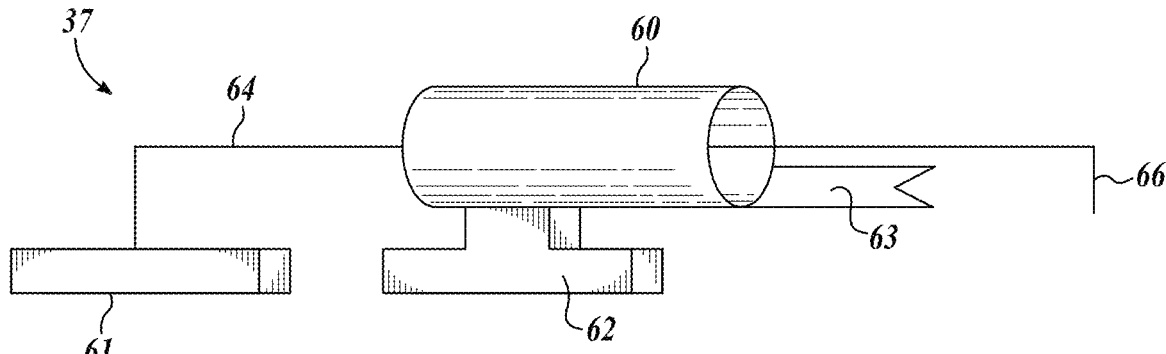
FIG. 4A shows a first view of an example micro-robot system, according to aspects of the disclosure.
Figure 4B:
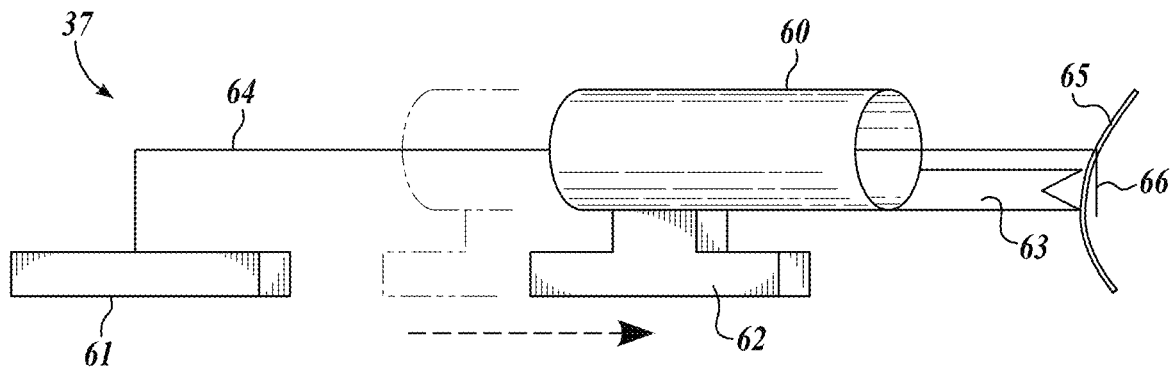
FIG. 4B shows a second view of the example micro-robot system and a movement of one or more micro-robots, according to aspects of the disclosure.
Figure 4C:
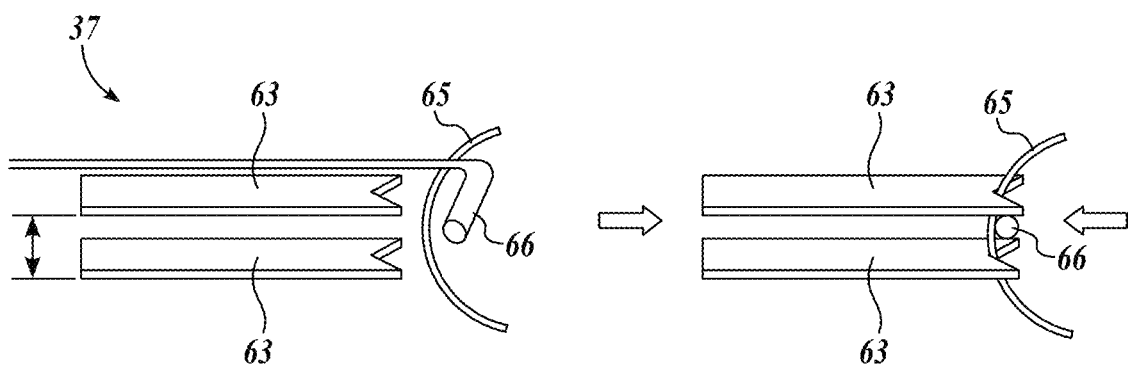
FIG. 4C shows a side view of V-grippers and a pull rod of a micro-robot in use to grip an eyelash of a subject, according to aspects of the disclosure.

FIG. 4A shows a first view of an example micro-robot system, in a stationary position, and FIG. 4B shows a second view of the example micro-robot system after a movement of one of the micro-robots. FIG. 4C shows a side view of a pair of V-grippers and a pull rod of a micro-robot in use to grip an eyelash of a subject. During an operational movement of a micro-robots assembly 37, a first micro-robot 61 can be relatively stationary and a second micro-robot 62 can move by way of a sliding movement with a tube and gripper receptacle 60 along a wire comb 64 for contact of one or more V-grippers 63 to an eyelash 65 of a subject, as shown at FIG. 4C. A pull rod 66, shown positioned between two V-grippers 63 at FIG. 4C, can secure the eyelash 65 within grooves of the V-grippers 63 for separation of the eyelash 65 from one or more adjacent eyelashes and/or application of an eyelash enhancement to the eyelash 65.

Figure 5:
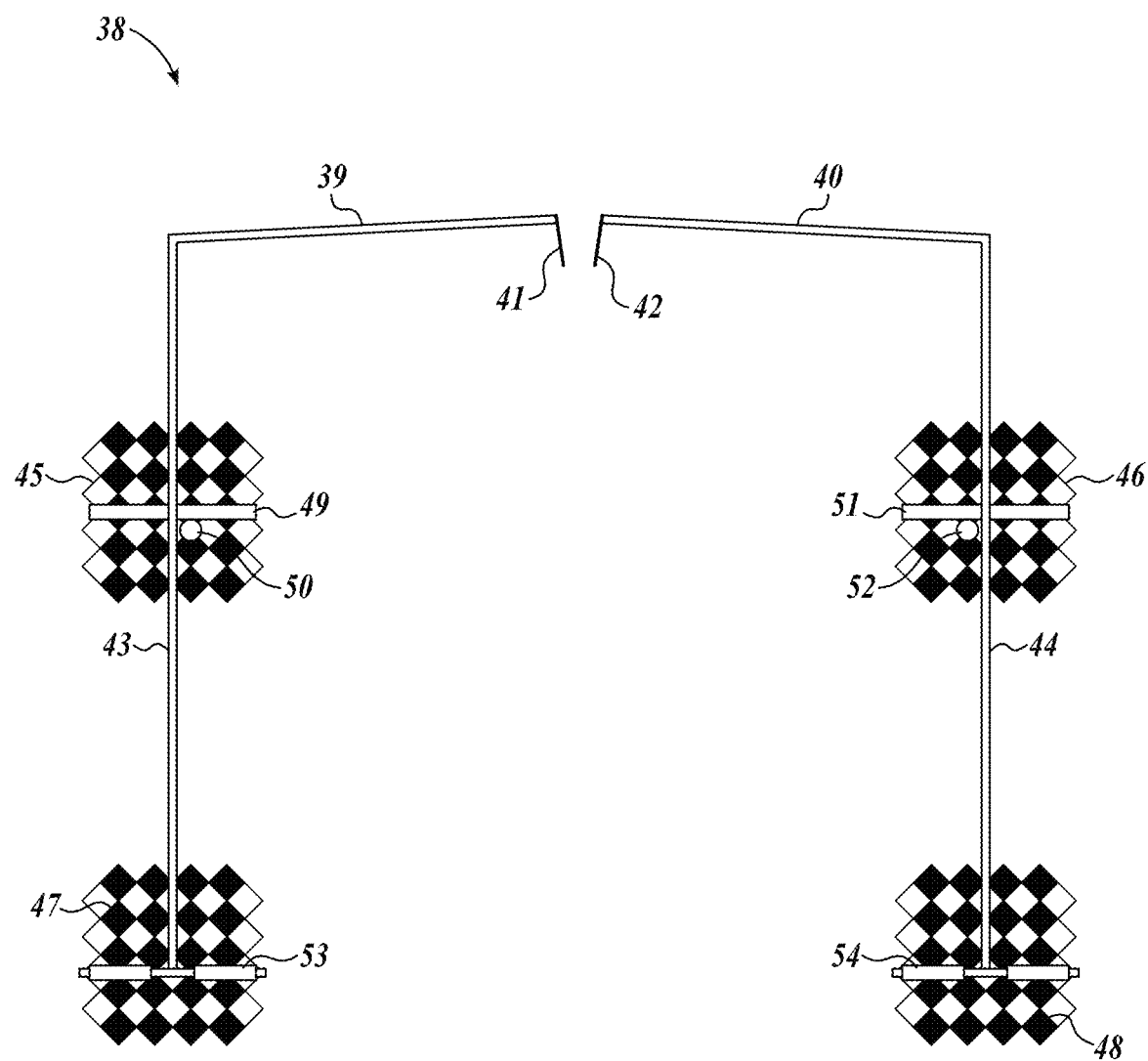
FIG. 5 shows a top view of a pair of micro-robots including shuttle bots and singulating bots, according to aspects of the disclosure.

As shown at FIG. 5, a pair of micro-robots 38, including shuttle bots and singulating bots, can be positioned adjacent to each other within a micro-robot system. As such, in embodiments, the system comprises a micro-robot system that comprises a first micro-robot comprising a first singulating arm (39, 41, 43) that is operably connected to a first shuttle bot 45 configured for movement of a first segment 39 of the first singulating arm along a first element 49, and a first singulating bot 47 configured for movement of a second segment 43 of the first singulating arm along a second element 53. The micro-robot system 38 comprises a second micro-robot comprising a second singulating arm (40, 42, 44) that is operably connected to a second shuttle bot 46 configured for movement of a second segment 40 of the second singulating arm along the first element 51 and a second singulating bot 48 configured for movement of a second segment 44 of the second singulating arm along the second element 54. The shown embodiment includes mechanical stops 50, 52, for stoppage of movement of the singulating arm segments 39, 40. In embodiments, the micro-robots can perform distinct movements that together achieve separation of individual eyelashes and application of eyelash enhancements to individual eyelashes.

As such, in embodiments, a separation movement of the first micro-robot (including 39, 41, 43), the second micro-robot (including 40, 42, 44), or both, separates an eyelash of the subject from one or more adjacent eyelashes of the subject for application of at least a portion of the eyelash enhancement to the eyelash, and a release movement of the first micro-robot, the second micro-robot, or both, releases the eyelash of the subject. In embodiments, the application of at least the portion of the eyelash enhancement to the eyelash comprises gluing a lash extension to the eyelash, for example, by way of gluing system 21 of FIG. 2.

Figure 6A:
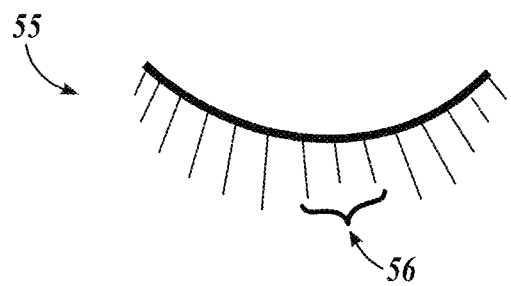
FIG. 6A shows a view of a subject's superior eyelashes prior to application of an eyelash enhancement, according to aspects of the disclosure.
Figure 6B:
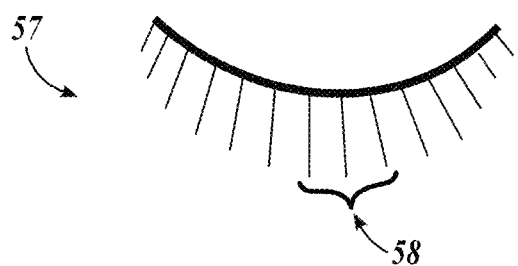
FIG. 6B shows a view of a subjects superior eyelashes after application of an eyelash enhancement to a subset of the eyelashes, according to aspects of the disclosure.
Figure 6C:
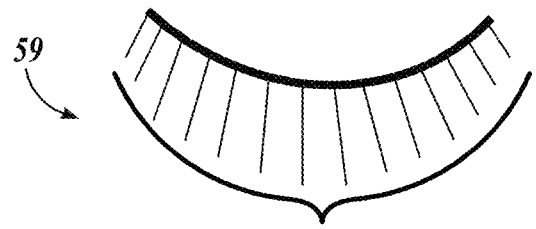
FIG. 6C shows a view of a subject's superior eyelashes after application of an eyelash enhancement to all of the eyelashes, according to aspects of the disclosure.

FIGS. 6A-6C show illustrative views of a subject's superior eyelashes prior to application of an eyelash enhancement (FIG. 6A), after application of an eyelash enhancement to a subset of the eyelashes (FIG. 6B), and after application of an eyelash enhancement to all of the eyelashes (FIG. 6C). In the shown example, a subject presents to the system with superior eyelashes 55 that include three shorter lashes 56. The subject can place their head within a space of the system, and the system can capture one or more images, such as stereo images, and perform a visual analysis of the subject's eyelashes and determine, based on at least the visual analysis, the presence of three shorter lashes 56 that are potential candidates for enhancement or lash extension as shown at FIG. 6A. The system can, at this point, suggest extension of at least these three shorter lashes 56 to a viewer as an option for eyelash enhancement, as described herein. If the subject elects extension of these three shorter lashes 56 as a subset of the total eyelashes 55, the system can then proceed to apply the extension to these three shorter lashes 56 to form partially-extended eyelashes 57 that include the shorter lashes with the extension applied thereto 58, as shown at FIG. 6B. In addition or alternatively, the subject can elect full extension of all eyelashes, and the system can proceed accordingly for generation of fully extended lashes 59, in which all or most of the eyelashes include the eyelash extension thereon.

In various aspects and embodiments, a system of the disclosure includes multiple computational and mechanical elements that are configured to work together to produce an outcome that is significantly greater than the sum of these individual parts, and this can be achieved at least in part by the use of "smart" or "artificially intelligent" computational elements and delicate and precise mechanical elements configured for performing micro-operations on the eyelashes in a non-invasive manner for the subject.

Accordingly, in aspects, the disclosure provides a "smart" eyelash enhancement system comprising circuitry configured to perform all or part of a method, including but not necessarily limited to control of visual analysis processes, control of computation of optimal steps for application of the eyelash enhancement to the subject's eyelashes, control of the application process by micro-robots based on real-time image processing and quality control measurements, and the like.

In embodiments, circuitry of a device and/or system is configurable with a processor and processor-executable instructions stored on a non-transitory machine-readable medium of the device and/or system. In embodiments, a system includes a software application configured to perform all or part of one or more methods or processes of the disclosure, in any order or combination. However, in embodiments, a system includes dedicated hardware circuitry. Further configuration of circuitry of the system can include wireless communication or networking circuitry, for example, circuitry configured for a wireless connection, such as a Bluetooth® connection, a Bluetooth® low energy (BLE) connection, and/or a Wi-Fi® connection, and/or a wired connection. The networking circuitry, in combination with other circuitry, can be used to request, retrieve, and/or receive data from a computational device or a remote server, for example.

In embodiments, a system can be managed, controlled, or operated with use of a computational device, such as a smartphone or personal computational device, that can be operated by a user via a graphical user interface, as known in the art. In embodiments, circuitry can include operable connection of one or more sensors with the processor, or other circuitry, for performing logic operations and/or methods based on data received from the one or more sensors, for example, digital stereo imagery, and the like.

Non-Limiting Embodiments

While general features of the disclosure are described and shown and particular features of the disclosure are set forth in the claims, the following non-limiting embodiments relate to features, and combinations of features, that are explicitly envisioned as being part of the disclosure. The following non-limiting Embodiments contain elements that are modular and can be combined with each other in any number, order, or combination to form a new non-limiting Embodiment, which can itself be further combined with other non-limiting Embodiments.

Embodiment 1. A system for computation and application of an eyelash enhancement, the system comprising: circuitry configured for a visual analysis of a subject's eyelashes and computation of at least one option for the eyelash enhancement based on the visual analysis; and circuitry configured to direct at least one micro-robot to apply the eyelash enhancement to the subject's eyelashes.

Embodiment 2. The system of Embodiment 1, wherein at least a portion of the circuitry configured for the visual analysis is remote to the at least one micro-robot.

Embodiment 3. The system of any one of Embodiments 1-2 or any other Embodiment, wherein the visual analysis comprises computation of the eyelash enhancement for a subset of the subject's eyelashes.

Embodiment 4. The system any one of Embodiments 1-3 or any other Embodiment, wherein the subset of the subject's eyelashes is computed by circuitry of the system as being shorter than other of the subject's eyelashes and wherein the eyelash enhancement comprises an eyelash extension.

Embodiment 5. The system of any one of Embodiments 1-4 or any other Embodiment, wherein the visual analysis comprises computation of the eyelash enhancement for all of the subject's eyelashes.

Embodiment 6. The system of any one of Embodiments 1-5 or any other Embodiment, wherein the eyelash enhancement comprises an eyelash extension.

Embodiment 7. The system of any one of Embodiments 1-6 or any other Embodiment, comprising circuitry configured to communicate the at least one option to the subject and receive at least one user-selected eyelash enhancement as at least a portion of the eyelash enhancement.

Embodiment 8. The system of any one of Embodiments 1-7 or any other Embodiment, comprising circuitry configured to compute a plurality of steps for application of the eyelash enhancement to the subject's eyelashes by the at least one micro-robot.

Embodiment 9. The system of any one of Embodiments 1-8 or any other Embodiment, comprising circuitry configured to monitor and analyze application of the eyelash enhancement for an application analysis and compute at least a portion of a plurality of steps for application of the eyelash enhancement to the subject's eyelashes by the at least one micro-robot, in real-time and during application of the eyelash enhancement, based on the application analysis.

Embodiment 10. The system of any one of Embodiments 1-9 or any other Embodiment, comprising circuitry configured to: perform at least one intrinsic calibration and at least one extrinsic calibration; capture at least one stereo image of the subject's eyelashes; compute, based on the at least one stereo image, a plurality of eyelash characteristics and a plurality of robot characteristics; compute, based on the plurality of eyelash characteristics, a region of the subject's eyelashes to receive at least a portion of the eyelash enhancement; and compute, based on the plurality of robot characteristics and the region, a plurality of micro-robot steps for movement of the micro-robot to the region and application of at least the portion of the eyelash enhancement to the region.

Embodiment 11. The system of any one of Embodiments 1-10 or any other Embodiment, wherein the plurality of micro-robot steps of e) comprises: movement of the micro-robot to the region; separation of at least a portion of the subject's eyelashes at the region; estimation of length of at least the portion of the subject's eyelashes at the region; and application of at least a portion of the eyelash enhancement to at least the portion of the subject's eyelashes at the region.

Embodiment 12. The system of any one of Embodiments 1-11 or any other Embodiment, wherein steps b) through e) are performed iteratively until at least the portion of the subject's eyelashes at the region have received at least the portion of the eyelash enhancement thereon.

Embodiment 13. The system of any one of Embodiments 1-12 or any other Embodiment, comprising a micro-robot system that comprises: a first micro-robot comprising a first singulating arm that is operably connected to: a first shuttle bot configured for movement of a first segment of the first singulating arm along a first element; and a first singulating bot configured for movement of a second segment of the first singulating arm along a second element; and a second micro-robot comprising a second singulating arm that is operably connected to: a second shuttle bot configured for movement of a second segment of the second singulating arm along the first element; and a second singulating bot configured for movement of a second segment of the second singulating arm along the second element.

Embodiment 14. The system of any one of Embodiments 1-13 or any other Embodiment, wherein a separation movement of the first micro-robot, the second micro-robot, or both, separates an eyelash of the subject from one or more adjacent eyelashes of the subject for application of at least a portion of the eyelash enhancement to the eyelash, and wherein a release movement of the first micro-robot, the second micro-robot, or both, releases the eyelash of the subject.

Embodiment 15. The system of any one of Embodiments 1-14 or any other Embodiment, wherein the application of at least the portion of the eyelash enhancement to the eyelash comprises gluing a lash extension to the eyelash.

While illustrative embodiments have been illustrated and described, it will be appreciated that various changes can be made therein without departing from the spirit and scope of the disclosure.

The embodiments of the invention in which an exclusive property or privilege is claimed are defined as follows:

1. A system for computation and application of an eyelash enhancement, the system comprising:
   circuitry configured for a visual analysis of a subject's eyelashes and computation of at least one option for the eyelash enhancement based on the visual analysis; and
   circuitry configured to direct at least one micro-robot to apply the eyelash enhancement to the subject's eyelashes.

2. The system of claim 1, wherein at least a portion of the circuitry configured for the visual analysis is remote to the at least one micro-robot.

3. The system of claim 1, wherein the visual analysis comprises computation of the eyelash enhancement for a subset of the subject's eyelashes.

4. The system of claim 3, wherein the subset of the subject's eyelashes is computed by circuitry of the system as being shorter than other of the subject's eyelashes and wherein the eyelash enhancement comprises an eyelash extension.

5. The system of claim 1, wherein the visual analysis comprises computation of the eyelash enhancement for all of the subject's eyelashes.

6. The system of claim 5, wherein the eyelash enhancement comprises an eyelash extension.

7. The system of claim 1, comprising circuitry configured to communicate the at least one option to the subject and receive at least one user-selected eyelash enhancement as at least a portion of the eyelash enhancement.

8. The system of claim 1, comprising circuitry configured to compute a plurality of steps for application of the eyelash enhancement to the subject's eyelashes by the at least one micro-robot.

9. The system of claim 1, comprising circuitry configured to monitor and analyze application of the eyelash enhancement for an application analysis and compute at least a portion of a plurality of steps for application of the eyelash enhancement to the subject's eyelashes by the at least one micro-robot, in real-time and during application of the eyelash enhancement, based on the application analysis.

10. The system of claim 1, comprising circuitry configured to:
a) perform at least one intrinsic calibration and at least one extrinsic calibration;
b) capture at least one stereo image of the subject's eyelashes;
c) compute, based on the at least one stereo image, a plurality of eyelash characteristics and a plurality of robot characteristics;
d) compute, based on the plurality of eyelash characteristics, a region of the subject's eyelashes to receive at least a portion of the eyelash enhancement; and
e) compute, based on the plurality of robot characteristics and the region, a plurality of micro-robot steps for movement of the micro-robot to the region and application of at least the portion of the eyelash enhancement to the region.

11. The system of claim 10, wherein the plurality of micro-robot steps of e) comprises:
i) movement of the micro-robot to the region;
ii) separation of at least a portion of the subject's eyelashes at the region;
iii) estimation of length of at least the portion of the subject's eyelashes at the region; and
iv) application of at least a portion of the eyelash enhancement to at least the portion of the subject's eyelashes at the region.

12. The system of claim 11, wherein steps b) through e) are performed iteratively until at least the portion of the subject's eyelashes at the region have received at least the portion of the eyelash enhancement thereon.

13. The system of claim 1, comprising a micro-robot system that comprises:
a first micro-robot comprising a first singulating arm that is operably connected to:
a first shuttle bot configured for movement of a first segment of the first singulating arm along a first element; and
a first singulating bot configured for movement of a second segment of the first singulating arm along a second element; and
a second micro-robot comprising a second singulating arm that is operably connected to:
a second shuttle bot configured for movement of a second segment of the second singulating arm along the first element; and
a second singulating bot configured for movement of a second segment of the second singulating arm along the second element.

14. The system of claim 13, wherein a separation movement of the first micro-robot, the second micro-robot, or both, separates an eyelash of the subject from one or more adjacent eyelashes of the subject for application of at least a portion of the eyelash enhancement to the eyelash, and wherein a release movement of the first micro-robot, the second micro-robot, or both, releases the eyelash of the subject.

15. The system of claim 14, wherein the application of at least the portion of the eyelash enhancement to the eyelash comprises gluing a lash extension to the eyelash.

* * * * *